(12) United States Patent
Tan et al.

(10) Patent No.: US 8,409,383 B1
(45) Date of Patent: Apr. 2, 2013

(54) PASSIVELY DAMPED VIBRATION WELDING SYSTEM AND METHOD

(75) Inventors: Chin-An Tan, Troy, MI (US); Bongsu Kang, Fort Wayne, IN (US); Wayne W. Cai, Troy, MI (US); Tao Wu, Temple, AZ (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/438,200

(22) Filed: Apr. 3, 2012

Related U.S. Application Data

(60) Provisional application No. 61/541,332, filed on Sep. 30, 2011.

(51) Int. Cl.
*B32B 37/00* (2006.01)
(52) U.S. Cl. ..................... 156/73.1; 156/580.1
(58) Field of Classification Search .......... 156/64, 156/73.1, 580.1, 580.2; 264/442, 443, 444, 264/445; 228/1.1, 110.1; 310/323.18
See application file for complete search history.

(56) References Cited

U.S. PATENT DOCUMENTS

| | | | | |
|---|---|---|---|---|
| 5,976,316 A | * | 11/1999 | Mlinar et al. | 156/580.2 |
| 6,085,489 A | * | 7/2000 | Bachner et al. | 53/410 |
| 6,605,178 B1 | * | 8/2003 | Shinohara et al. | 156/379.6 |

* cited by examiner

*Primary Examiner* — James Sells
(74) *Attorney, Agent, or Firm* — Quinn Law Group, PLLC

(57) ABSTRACT

A vibration welding system includes a controller, welding horn, an anvil, and a passive damping mechanism (PDM). The controller generates an input signal having a calibrated frequency. The horn vibrates in a desirable first direction at the calibrated frequency in response to the input signal to form a weld in a work piece. The PDM is positioned with respect to the system, and substantially damps or attenuates vibration in an undesirable second direction. A method includes connecting the PDM having calibrated properties and a natural frequency to an anvil of an ultrasonic welding system. Then, an input signal is generated using a weld controller. The method includes vibrating a welding horn in a desirable direction in response to the input signal, and passively damping vibration in an undesirable direction using the PDM.

20 Claims, 2 Drawing Sheets

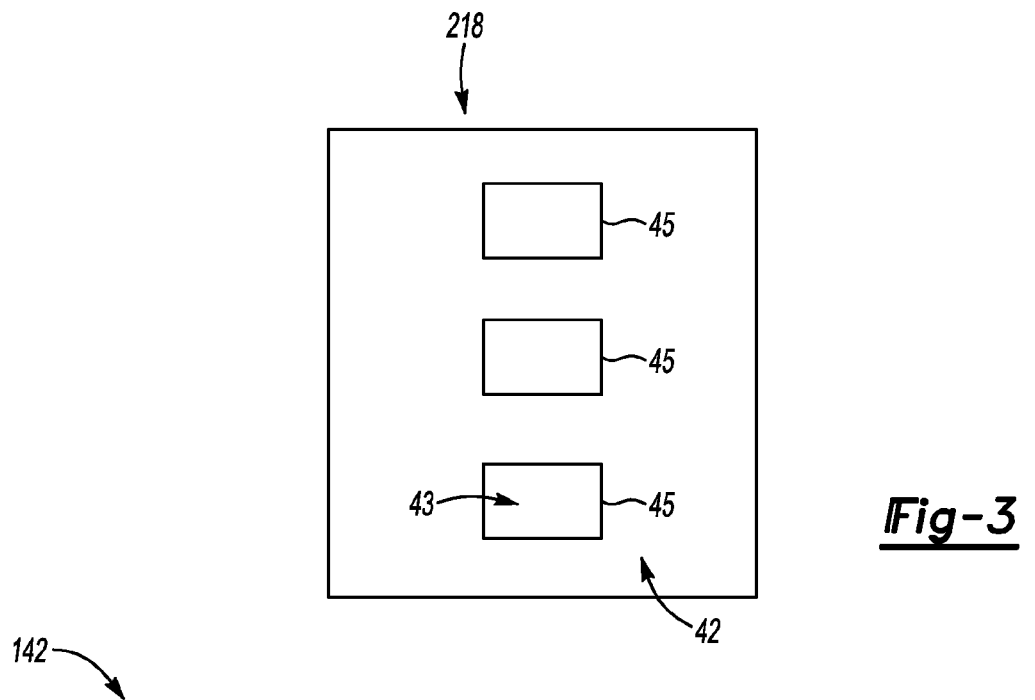
Fig-3
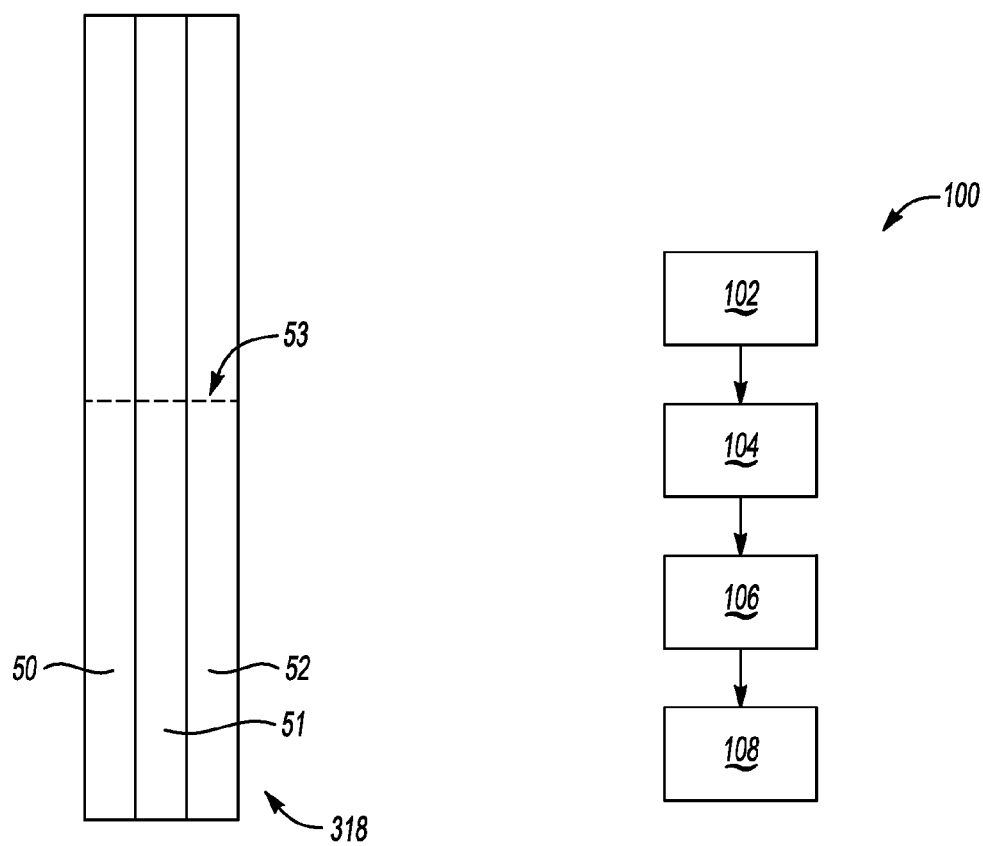
Fig-4
Fig-5

PASSIVELY DAMPED VIBRATION WELDING SYSTEM AND METHOD

CROSS-REFERENCE TO RELATED APPLICATIONS

This application claims the benefit of U.S. Provisional Patent Application No. 61/541,332 filed on Sep. 30, 2011, which is hereby incorporated by reference in its entirety.

STATEMENT REGARDING FEDERALLY SPONSORED RESEARCH OR DEVELOPMENT

This invention was made with the support of the United States Government under an Agreement/Project DE-EE0002217, Department of Energy Recovery and Reinvestment Act of 2009, Battery Pack Manufacturing B511. The United States Government may have certain rights in this invention.

TECHNICAL FIELD

The present disclosure relates to an ultrasonic welding system that uses passive damping techniques to optimize weld quality.

BACKGROUND

In an ultrasonic welding process, adjacent surfaces of a clamped work piece are joined using vibration energy. The transmission of vibration energy through the material of the work piece creates surface friction and heat along interfacing work piece surfaces. The heat softens the interfacing surfaces, which are ultimately bonded together at a resultant weld spot or other welded joint.

A typical ultrasonic welding system includes various interconnected welding components. Primary among these components are a vibrating sonotrode/welding horn and an anvil assembly. The anvil assembly may include an anvil and a back plate, with the anvil being bolted or otherwise attached to a rigid support member via the back plate. The work piece is clamped between the horn and the anvil. The horn is then caused to vibrate at a calibrated frequency and amplitude in response to a high-frequency input signal from a welding controller/power supply.

SUMMARY

An ultrasonic welding system as disclosed herein includes a vibrating sonotrode/welding horn, an anvil assembly, and a passive damping mechanism (PDM). The anvil assembly includes an anvil and a back plate. The PDM may be positioned with respect to a suitable portion of the system, for instance the anvil assembly, to cancel or damp certain undesired vibrations occurring in the system. While conventional ultrasonic welding systems use various means for controlling an input vibration to the horn in a desired direction, e.g., a vertical x direction, conventional anvil designs fail to account for vibrations in other directions such as the horizontal z or rotating θ directions. The actual direction that is desirable in a given application may vary with the work piece materials and the various devices that make up the welding system. For illustrative consistency, the x direction is referred to hereinafter as desirable, while vibrations in any other direction are referred to as undesirable.

It is recognized herein that anvil stiffness and other system design properties can contribute to such undesirable vibrations, and that these undesirable vibrations may degrade the resultant weld quality. Sufficient tensile strength and minimal deformation, perforation, and cracking are all desirable weld qualities. Reduced welding tool fatigue and extended tool life are both desirable system qualities. Therefore, the present passive damping approach is intended to optimize these and other qualities via use of the PDM as set forth in detail below.

In particular, a vibration welding system according to one embodiment includes a controller, a welding horn, an anvil, and a PDM positioned with respect to the system. The controller generates an input signal having a calibrated frequency. The welding horn receives the input signal and vibrates in a desirable first direction at the calibrated frequency in response to the input signal, thereby forming a weld in a work piece. The horn also vibrates in an undesirable second direction. Calibrated properties of the PDM substantially damps or attenuates vibration in the undesirable second direction.

In another embodiment, the PDM is positioned with respect to the anvil, and includes first and second portions. The first portion is positioned between the anvil and a back plate of an anvil assembly. The second portion tunes a first or higher natural frequency of the PDM to the calibrated frequency. The second portion may define a cantilevered structure with respect to the anvil to thereby substantially damp or attenuate vibration of the anvil in the undesirable second direction.

A method is also disclosed herein for damping undesirable vibrations in an ultrasonic welding process. The method includes connecting a PDM with respect to an anvil of an ultrasonic welding system. The PDM has a calibrated length and a first natural frequency. The method also includes generating an input signal using a weld controller. The input signal has a calibrated ultrasonic frequency. Thereafter, the method includes vibrating a welding horn in a desirable direction in response to the input signal, and also in an undesirable direction. The vibration in the undesirable direction is passively damped using the PDM. The calibrated length of the PDM tunes the first natural frequency of the PDM to the calibrated ultrasonic frequency of the input signal.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic illustration of an example damping mechanism having voids or recesses filled with a friction damping material.

FIG. 4 is a schematic side view illustration of an example damping mechanism having multiple laminated layers.

FIG. 5 is a flow chart describing a method for passively damping or attenuating anvil vibrations in the system shown in FIG. 1.

DETAILED DESCRIPTION

Figure 1:
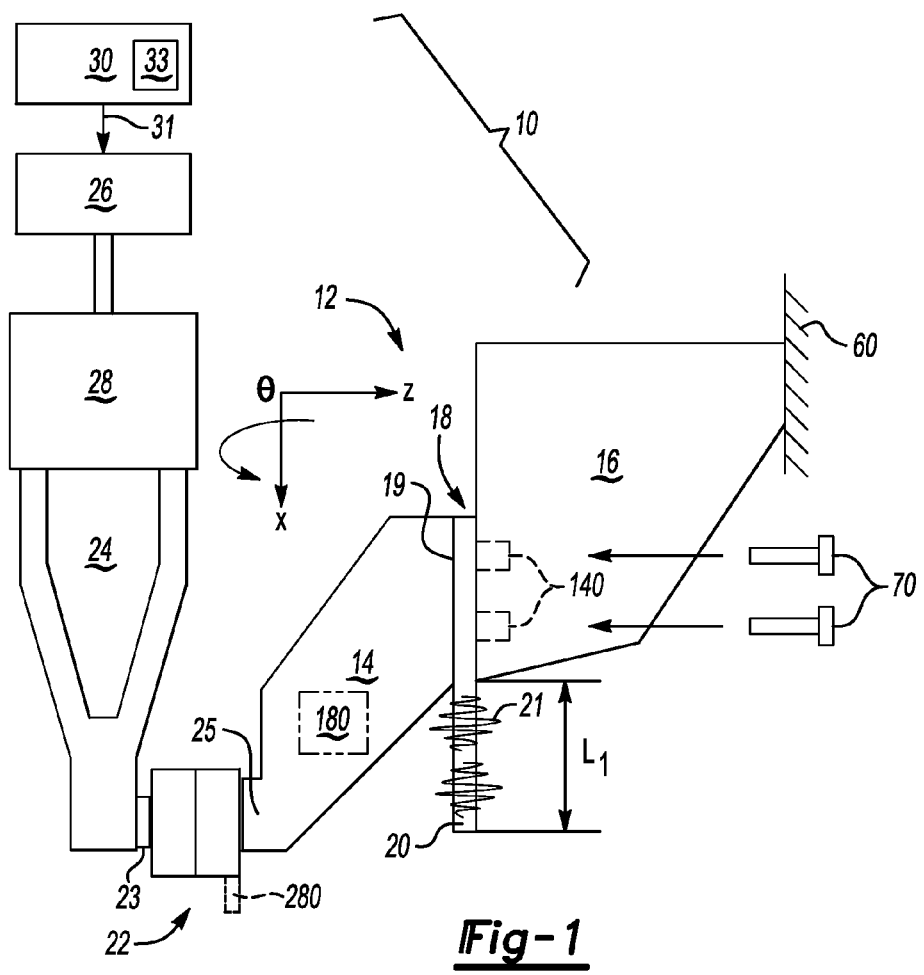
FIG. 1 is a schematic illustration of an example vibration welding system having an anvil assembly that includes an example damping mechanism.

Referring to the drawings, wherein like reference numbers refer to like components, an example ultrasonic welding system 10 is shown in FIG. 1. The system 10 is configured to form a welded joint using ultrasonic vibration, a process that is well understood in the art. While referred to hereinafter by the conventional term "ultrasonic" for illustrative consistency, those of ordinary skill in the art will appreciate that other frequency ranges may also be used without departing from the intended inventive scope.

The system 10 of FIG. 1 is specially configured to passively damp or attenuate certain undesirable vibrations. For instance, desirable vibrations may be imparted in the x direction during vibration welding, with vibrations occurring in any other direction, e.g., the indicated transverse z or rotating θ directions, being undesirable. Thus, the terms "desirable" and "undesirable" relate to the intended direction, which may vary depending on the application. For illustrative clarity and consistency, x-direction vibrations will be treated hereinafter as being the desirable vibrations, with damping occurring with respect to vibrations in any other direction.

An anvil assembly 12 of the system 10 may include an anvil 14 and a back plate 16. The anvil 14 may be fastened via bolts 70 to a back plate 16. The back plate 16 in turn may be connected to a support member 60. Anvil vibrations may result from various structural properties, including but not limited to the stiffness of any connection via the bolts 70, the support member 60, and the geometry/materials of construction of the system 10, including but not limited to the particular work piece 22 being welded. It is recognized herein that undesirable anvil vibrations may adversely affect the quality of a resultant weld formed in the work piece 22. Such undesirable vibrations are passively damped as set forth herein.

The system 10 of FIG. 1 includes different welder devices, including the anvil assembly 12 and a vibrating sonotrode/welding horn 24. As a whole, the anvil 14 provides a relatively stiff mass sufficient for opposing the horn 24 during the welding process. The horn 24 may include welding pads 23. The pads 23 may include knurl patterns in the form of, e.g., raised bumps, ridges, or any other textured pattern providing sufficient traction for gripping the work piece 22. The anvil 14 may likewise have similar pads 25 and knurl patterns. The pads 23 and 25 together facilitate the secure gripping of the work piece 22.

To properly drive and control the ultrasonic welding process, a welding power supply 30 may be used to transform available source power into a form that is more conducive to vibration welding. For instance, the power supply 30 can be electrically- connected to any suitable energy source, e.g., a 50-60 Hz AC wall socket. In this instance the power supply 30 may include the required voltage rectifiers and inverters for generating a high-frequency waveform suitable for vibration welding. The power supply 30 may include a welding controller 33 as part of the power supply as shown or as a separate device.

The power supply 30 and the welding controller 33 ultimately transform source power into a suitable power control signal having a predetermined waveform characteristic(s) suited for use in the vibration welding process, for example a frequency of several Hertz (Hz) to about 40 KHz, or higher frequencies depending on the particular application. Additional equipment may include a converter 26 and a booster 28. The converter 26 has the required mechanical structure for producing a mechanical vibration in response to the input signal (arrow 31), e.g., a piezoelectric stack. The booster 28 amplifies the amplitude of vibration of an input signal (arrow 31) having a calibrated frequency, and/or for changing a direction of any applied clamping force between the horn 24 and the anvil 14.

Still referring to FIG. 1, the anvil assembly 12 includes a passive damping mechanism (PDM) 18. In the example embodiment shown, the PDM 18 is a shim that is positioned between the anvil 14 and the back plate 16. However, the PDM 18 may be positioned anywhere in the system 10, e.g., on the anvil 14 or on the work piece 22 as is respectively indicated in phantom by the alternative PDMs 180 and 280. In a particular embodiment, multiple PDMs, e.g., the PDM 18, 180, and 280, may be used at the same time in the same system 10, with each attenuating certain directions of undesirable vibrations. The damping mechanism 18 may be a tuned mass damper (TMD) in one embodiment, wherein the damping mechanism 18 is characterized by a natural/resonant frequency. This natural/resonant frequency, which may be a first, second, or higher natural frequency, is represented schematically in FIG. 1 by example waveforms 21.

Calibrated properties of the PDM 18 such as length, size, geometry, materials of construction, etc., are configured to tune a natural frequency of the PDM 18 to the calibrated frequency of the input signal (arrow 31). In other embodiments the PDM 18 may use friction damping and/or material damping to dampen the undesirable vibrations occurring in the system 10, e.g., at the anvil 14.

The damping mechanism 18 in the main embodiment shown in FIG. 1 may include a first portion 19 and second portion 20. The portions 19 and 20 may be integrally or separately formed. The first portion 19 may be optionally positioned on the anvil 14, on the work piece 22, between the anvil 14 and the back plate 16 as shown in FIG. 1, between the back plate 18 and the support member 60, etc. The second portion 20 can extend for a calibrated length ($L_1$) from the anvil 14 toward the work piece 22. Thus, the damping mechanism 18 can form, in a non-limiting embodiment, a cantilevered structure with respect to the anvil assembly 12. As noted above, the calibrated length ($L_1$) of the second portion 20 may be calculated or selected so as to tune the first natural frequency of the PDM 18 to the input frequency of the horn 24.

In an example embodiment, the anvil 14 may be press-fitted to a mating key way or recess defined by the back plate 16, and thus may include optional finger joints 140. The finger joints 140 may extend into/through the back plate 16 to increase the contact area and joint stiffness between the anvil 14 and the back plate 16 in each loading direction. Depending on the embodiment the bolts 70 may be used with such press-fitting, or press-fitting may be used alone. Alternatively, an optional dovetail joint 240 of the type shown in FIG. 2 may be used for the same purpose.

Figure 2:
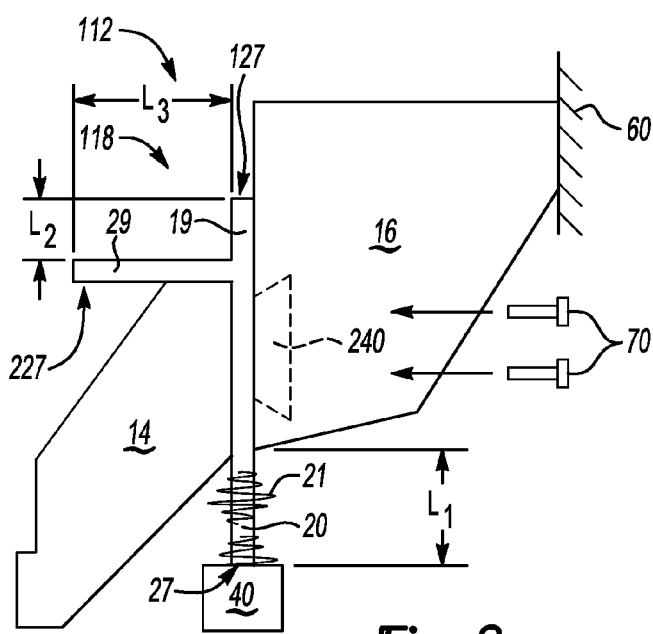
FIG. 2 is a schematic illustration of an example damping mechanism usable with the welding system shown in FIG. 1.

Referring to FIG. 2, an alternative anvil assembly 112 may include a PDM 118. The example PDM 118 may include a third portion 29 having a distal end 227 that is arranged with respect to the first portion 19, and/or with respect to the anvil 14 and/or the back plate 16. The arrangement of the third portion 29 with respect to the first portion 19 may be orthogonal as shown, or it may be non-orthogonal depending on the design of the system 10. Alternatively, the third portion 29 may be connected to or formed integrally with the second portion 20, e.g., bent into a right angle from a single piece of material or welded together, with or without the first portion 19.

An end 27 or 127 of the respective second portion 20 or first portion 19 may be connected to a suitable object such as a non-linear passive controller 40, e.g., a dashpot or nonlinear damper, so as to further damp the vibrations of the anvil 14. Although not shown in FIG. 2, end 227 of the third portion 29 may likewise be connected to a damping body. The lengths $L_1$, $L_2$, and $L_3$ of the respective portions 19, 20, and 29 may be calibrated to provide the required damping response.

As shown in FIG. 3, the PDM 18 of FIG. 1 may be alternatively embodied as a PDM 218. The PDM 218 may be formed from a sheet 42 of a suitable material, only a portion of which is shown in FIG. 3. The portion of the sheet 42 positioned between the anvil 14 and the back plate 16 of FIG. 1, for instance, may define at least one cutout or recess 45, each of which is substantially filled, e.g., more than 50% filled with, a suitable damping material 43 such as rubber or another elastomer, cast iron, etc. The length ($L_1$) shown in FIGS. 1 and 2 may not include such recesses 45, and therefore this portion is omitted from FIG. 3 for added clarity.

As shown in FIG. 4, an alternative sheet 142, with or without the recesses 45 of FIG. 3, may be formed from multiple laminated layers 50, 51, 52 each constructed of the same or of different materials to thereby form yet another PDM 318. Lamination may be as shown, or it may be along line 53 such that the first portion 19 and second portion 20 of each adjacent sheet are laminated, welded, or otherwise attached to each other. Such a design may help to absorb vibration energy from the undesired anvil vibrations through friction damping. The specific materials, relative thicknesses, geometry, and surface conditions of the various layers 50, 51, 52, can vary without departing from the intended inventive scope.

Referring to FIG. 5, an example method 100 is shown for passively damping undesirable anvil vibrations in an ultrasonic welding system, for instance the example system 10 shown in FIG. 1 and described above.

Beginning with step 102, the PDM 18 of FIG. 1 is provided, or any of the alternative embodiments shown in FIGS. 2-4. Step 102 may include providing the damping mechanism 18 with a calibrated length. The calibrated lengths ($L_1$, $L_2$, and/or $L_3$) may be selected so as to tune the first natural frequency of the PDM 18 to the calibrated frequency of the input signal (arrow 31 of FIG. 1), e.g., an ultrasonic frequency of about 10 kHz-30 kHz in one possible embodiment.

At optional step 104, the PDM 18 may be configured with any of the features of the PDM 118, 218, or 318 of respective FIGS. 2, 3, and 4. For instance, the third portion 29 shown in FIG. 2 may be connected with respect to the first and second portions 19 and 20, respectively, or the recesses 45 shown in FIG. 3 may be formed in one or more sheets 42 and subsequently filled with damping material 43. The sheet 42 forming the PDM 18 or any of its embodiments may be laminated from the layers 50, 51, 52 shown in FIG. 4. Any or all of these features may be included as needed to provide the desired amount of friction and/or material damping of the anvil 14 of FIG. 1.

At step 106, the damping mechanism 18 is integrated into the system 10 by positioning the damping mechanism 18 with respect to the system 10, e.g., between the anvil 14 and the back plate 16 as shown, or on the work piece 22, on the anvil 14, etc. Step 104 may include using fasteners to bolt the damping mechanism 18 between the anvil 14 and the back plate 16 such that the second portion 20 shown in FIG. 1 extends outwardly in the x direction as indicated in that Figure. Step 104 may alternatively include welding, brazing, or bonding the damping mechanism 18 to the anvil assembly 12 and/or the work piece 22.

At step 108, the welding controller 33 of FIG. 1 is energized, and the input signal (arrow 31) is transmitted to the converter 26. Upon receiving the input signal (arrow 31) and its calibrated frequency, the converter 26 is caused to vibrate. The amplitude of vibration may be amplified as needed by the booster 28. The horn 24 thereafter vibrates at the calibrated frequency of the input signal (arrow 31). Due to the presence of the damping mechanism 18 in the system 10, this occurs without also causing undesirable vibration of the anvil 14.

While the best modes for carrying out the invention have been described in detail, those familiar with the art to which this invention relates will recognize various alternative designs and embodiments for practicing the invention within the scope of the appended claims.

The invention claimed is:

1. A vibration welding system comprising:
a controller configured to generate an input signal having a calibrated frequency;
a welding horn that vibrates in a desirable first direction at the calibrated frequency in response to the input signal to thereby form a weld in a work piece;
an anvil positioned with respect to the welding horn; and
a passive damping mechanism (PDM) positioned with respect to the vibration welding system;
wherein the PDM has a calibrated set of damping properties that damp or attenuate vibration in an undesirable second direction.

2. The system of claim 1, wherein the PDM is connected with respect to the anvil and extends a calibrated length from the anvil, and wherein the calibrated length is one of the damping properties.

3. The system of claim 1, wherein the calibrated set of damping properties includes at least one of a calibrated length, a calibrated material, and a calibrated geometry.

4. The system of claim 1, PDM is a tuned mass damper having a natural frequency that is tuned to the calibrated frequency of the input signal.

5. The system of claim 1, wherein the PDM is positioned between the anvil and a back plate of an anvil assembly that is mounted to both the anvil and to a support member.

6. The system of claim 5, wherein the anvil is press-fitted to the back plate.

7. The system of claim 1, wherein the PDM includes one portion that is orthogonally arranged with respect to another portion.

8. The system of claim 1, wherein the PDM defines a recess that is substantially filled with a damping material.

9. The system of claim 1, wherein the PDM includes a plurality of PDMs positioned in the system, wherein each of the plurality of PDMs is configured to attenuate vibration in a corresponding direction.

10. The system of claim 8, wherein the damping material is cast iron.

11. The system of claim 1, wherein the PDM is constructed from multiple laminated layers.

12. The system of claim 1, wherein an end of the PDM is connected to a dashpot.

13. A method comprising:
connecting a passive damping mechanism (PDM) with respect to an anvil of an ultrasonic welding system, wherein the PDM has a calibrated set of damping properties and a natural frequency;
generating an input signal using a weld controller, wherein the input signal has a calibrated ultrasonic frequency;
vibrating a welding horn in a desirable direction in response to the input signal; and
passively damping vibration in an undesirable direction using the PDM;
wherein the calibrated length of the PDM tunes the natural frequency of the PDM to the calibrated ultrasonic frequency of the input signal.

14. The method of claim 13, wherein the PDM is a tuned mass damper having a natural frequency that is tuned to the calibrated frequency of the input signal.

15. The method of claim 13, wherein the PDM with respect to an anvil includes:

positioning the PDM between the anvil and a back plate of an anvil assembly; and mounting the back plate to the anvil and to a support member.

16. The method of claim 13, further comprising:

connecting a dashpot at one end of the PDM.

17. A vibration welding system comprising:

a controller configured to generate an input signal having a calibrated frequency;

a welding horn that vibrates in a desirable first direction at the calibrated frequency in response to the input signal to thereby form a weld in a work piece;

an anvil; and a passive damping mechanism (PDM) positioned between the anvil and a back plate of an anvil assembly, wherein the back plate is mounted to the anvil and to a support member, and wherein the PDM includes:

a first portion that is positioned between the anvil and the back plate; and a second portion that extends for the calibrated length and that tunes the first natural frequency of the PDM to the calibrated frequency;

wherein the second portion extends toward the work piece to thereby define a cantilevered structure.

18. The system of claim 17, wherein the PDM further includes a third portion that is positioned adjacent to the anvil and orthogonally arranged with respect to the first portion, and a dashpot that is connected to a distal end of the second portion.

19. The system of claim 16, wherein the PDM defines at least one recess that is substantially filled with a damping material.

20. The system of claim 16, wherein the PDM is constructed from multiple laminated layers.

* * * * *